United States Patent
Zhang et al.

(10) Patent No.: US 8,729,818 B2
(45) Date of Patent: May 20, 2014

(54) DRIVING CIRCUIT STRUCTURE FOR LIGHT EMITTING DIODES

(75) Inventors: Wei-Qiang Zhang, Shanghai (CN); Li-Zhi Xu, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 301 days.

(21) Appl. No.: 13/241,233

(22) Filed: Sep. 23, 2011

(65) Prior Publication Data

US 2012/0262081 A1 Oct. 18, 2012

(30) Foreign Application Priority Data

Apr. 18, 2011 (CN) .......................... 2011 1 0097201

(51) Int. Cl.
*H05B 41/16* (2006.01)

(52) U.S. Cl.
USPC .......... 315/276; 315/247; 315/291; 315/312; 315/185 S

(58) Field of Classification Search
USPC .............. 315/291, 307–326, 276–279, 185 S, 315/224, 225, 247, 200 R
See application file for complete search history.

(56) References Cited

U.S. PATENT DOCUMENTS

| 6,531,835 | B2* | 3/2003 | Chen et al. | 315/307 |
| 8,278,832 | B2* | 10/2012 | Hung et al. | 315/219 |
| 8,288,961 | B2* | 10/2012 | Chen et al. | 315/294 |
| 2009/0021175 | A1* | 1/2009 | Wendt et al. | 315/200 R |

FOREIGN PATENT DOCUMENTS

| CN | 1929277 A | 3/2007 |
| CN | 101395791 A | 3/2009 |
| CN | 101510723 A | 8/2009 |
| CN | 101621877 A | 1/2010 |
| CN | 101959345 A | 1/2011 |
| TW | 200521954 | 7/2005 |
| TW | 200915922 A | 4/2009 |

\* cited by examiner

*Primary Examiner* — Tuyet Thi Vo
(74) *Attorney, Agent, or Firm* — CKC & Partners Co., Ltd.

(57) ABSTRACT

The invention discloses a driving circuit structure for driving light-emitting loads. The driving circuit structure may include a power supplying device, a signal processing device and an impedance balancing device and a dimming control unit. The power supplying device is used for supplying an alternating current power supply. The signal processing device is used for converting the alternating current power supply into a direct current power supply, so as to drive the light-emitting loads. The impedance balancing device is used for balancing an alternating current magnitude of the alternating current power supply, so as to stabilize a direct current magnitude of the direct current power supply for driving the light-emitting loads. The dimming control unit is capable of controlling output luminance of the light-emitting loads.

17 Claims, 7 Drawing Sheets

DRIVING CIRCUIT STRUCTURE FOR LIGHT EMITTING DIODES

RELATED APPLICATIONS

This application claims priority to Chinese Application Serial Number 201110097201.4, filed Apr. 18, 2011, which is herein incorporated by reference.

BACKGROUND

1. Field of Invention

The present invention relates to a driving circuit structure. More particularly, the present invention relates to a driving circuit structure for driving light-emitting loads.

2. Description of Related Art

Due to the development in light-emitting diode (LED) technology in recent times, the output luminance and the lighting efficiency of LEDs have improved dramatically. Therefore, LEDs are gradually replacing traditional lamps and are being used in modern lighting devices. For example, LEDs can be used in household lighting devices, vehicle lighting devices, flashlights, liquid crystal display (LCD) panel backlights, traffic signs, guideposts and other device.

The LED is a direct current (DC) load. In an application with multiple LEDs, the magnitude of the current going through each of the LEDs may be different because each LED may have slight differences in its characteristics, such that the output luminance may be uneven in the electronic devices (e.g., LCD panels) utilizing the LEDs, and also, the working durability of each LED may be shortened. Recently, LEDs made using cutting-edge techniques have a small impedance and a compact structure. In this case, when there is a variation in the driving voltage of the LED driving circuit, this may result in a significant variation in the operating current through the LED.

Many LED current balancing solutions have been developed in an effort to solve the problem of uneven currents on LEDs. A traditional power supply circuit with a current balancing feature may include linear voltage adjusters, low-pass filters and several current mirrors. However, the traditional power supply circuit with a current balancing feature utilizes a large number of linear voltage adjusters and current mirrors for corresponding to the LED loads, such that the power consumption of the circuit is high, the efficiency thereof is low, and the circuit requires many components and is therefore complex.

SUMMARY

In order to solve the aforesaid problem, this disclosure provides a driving circuit structure for driving at least one light-emitting load. The driving circuit structure of the disclosure includes a simple impedance balancing device in front of the light-emitting loads, so as to balance the direct current (DC) power supply on different light-emitting loads and elevate the stability of the DC driving current. Furthermore, the disclosure further discloses a simple dimming mechanism which is easily implemented. The dimming mechanism utilizes a dimming control module to regulate (e.g., prolong or shorten) the duty or frequency of the switching control signal for pulse-width modulation (PWM) in the resonance transforming module, such that the waveform of an input signal can be modified, ultimately changing the overall output luminance of the light-emitting loads.

Therefore, an aspect of the invention is to provide a driving circuit structure for driving at least one light-emitting load. The driving circuit structure includes a power supply device, a signal processing device and an impedance balancing device. The power supply device is used for supplying an alternating current (AC) power supply. The signal processing device is used for transforming the alternating current power supply into a direct current (DC) power supply for driving the at least one light-emitting load. The impedance balancing device is used for balancing an alternating current magnitude of the alternating current supply, so as to stabilize a direct current magnitude of the direct current power supply used for driving the at least one light-emitting load. In an embodiment, the power supply device includes a transformer and a resonance transforming module. The resonance transforming module is used for generating a resonance pulse signal to a primary side of the transformer, so as to form the alternating current power supply on a secondary side of the transformer.

According to an embodiment of this disclosure, the power supply device includes a switch unit and a resonance impedance unit. An output of the switch unit is coupled to the primary side of the transformer. The switch unit selectively transmits an input voltage from the switch unit to the primary side of the transformer according to a switching frequency. The resonance impedance unit is coupled between the switch unit and the transformer. A natural resonance frequency of the resonance impedance unit is approximately equaled to the switching frequency. In this embodiment, the resonance impedance unit includes a capacitor and an inductor, in which the capacitor and the inductor of the resonance impedance unit are series-wound. The resonance impedance unit is used for blocking feedback noise induced when an output load of the driving circuit structure is varied.

According to another embodiment of this disclosure, the power supply device includes a switch unit and a dimming control unit. An output of the switch unit is coupled to the primary side of the transformer. The switch unit switches according to at least one pulse-width modulation (PWM) signal, such that an input voltage is selectively transmitted from the switch unit to the primary side of the transformer. The dimming control unit is used for adjusting a duty or a frequency of the at least one pulse-width modulation signal, or used for periodically turning off the at least one pulse-width modulation signal, so as to control output luminance of the at least one light-emitting load. In this embodiment, the switch unit includes a half-bridge switch circuit or a full-bridge switch circuit.

According to another embodiment of this disclosure, the signal processing device includes at least one rectifier unit corresponding to the at least one light-emitting load. The at least one rectifier unit is used for transforming the alternating current power supply into the direct current power supply. In this embodiment, the at least one rectifier unit may include a half-wave rectifier circuit or a full-wave rectifier circuit.

According to another embodiment of this disclosure, the impedance balancing device includes at least one balance unit. The at least one balance unit is coupled between the secondary side of the transformer and the at least one light-emitting load. The at least one balance unit includes a capacitor.

Another aspect of the invention is to provide a driving circuit structure for driving at least one light-emitting load. The driving circuit structure includes a transformer, a resonance transforming module, at least one rectifier unit and at least one balancing unit. The at least one light-emitting load is coupled to a secondary side of the transformer. The resonance transforming module is coupled to a primary side of the transformer. The resonance transforming module includes a resonance impedance unit. The at least one rectifier unit is coupled between the secondary side of the transformer and the at least one light-emitting load. The at least one balancing unit is coupled between the secondary side of the transformer and the at least one rectifier unit. The at least one balancing unit is used for balancing a direct current magnitude on the at least one light-emitting unit.

According to an embodiment of this disclosure, the power supply device comprises a switch unit. An output of the switch unit is coupled to the primary side of the transformer. The switch unit selectively transmits an input voltage from the switch unit to the primary side of the transformer according to a switching frequency. The resonance impedance unit is coupled between the switch unit and the transformer. A natural resonance frequency of the resonance impedance unit is approximately equaled to the switching frequency.

Another aspect of the invention is to provide a driving circuit structure for driving at least one light-emitting load. The driving circuit structure includes a transformer, a resonance transforming module, at least one balancing unit and a dimming control unit. The at least one light-emitting load is coupled to a secondary side of the transformer. The resonance transforming module is coupled to a primary side of the transformer. The at least one balancing unit is coupled between the secondary side of the transformer and the at least one light-emitting load. The at least one balancing unit is used for balancing a direct current magnitude on the at least one light-emitting unit. The dimming control unit is coupled with the resonance transforming module. The dimming control unit is used for controlling output luminance of the at least one light-emitting load.

According to an embodiment of this disclosure, the resonance transforming module includes a switch unit. An output of the switch unit is coupled to the primary side of the transformer. The switch unit switches according to at least one pulse-width modulation signal, such that an input voltage is selectively transmitted from the switch unit to the primary side of the transformer. The dimming control unit is used for adjusting a duty or a frequency of the at least one pulse-width modulation signal, or used for periodically turning off the at least one pulse-width modulation signal, so as to control output luminance of the at least one light-emitting load.

Another aspect of the invention is to provide a driving circuit structure for driving at least one light-emitting load. The driving circuit structure includes a transformer, a resonance transforming module, a signal processing device and at least one balancing unit. The resonance transforming module is used for generating a resonance pulse signal to a primary side of the transformer, so as to form an alternating current power supply on a secondary side of the transformer. The signal processing device is used for transforming the alternating current power supply into a direct current power supply for driving the at least one light-emitting load. The at least one balancing unit is coupled between the secondary side of the transformer and the at least one light-emitting load. Each of the balancing unit includes a capacitor. The at least one balancing unit is used for balancing an alternating current magnitude of the alternating current supply, so as to stabilize a direct current magnitude of the direct current power supply used for driving the at least one light-emitting load.

According to an embodiment of this disclosure, the resonance transforming module includes a switch unit. An output of the switch unit is coupled to the primary side of the transformer. The switch unit selectively transmits an input voltage from the switch unit to the primary side of the transformer according to a switching frequency. The resonance impedance unit is coupled between the switch unit and the transformer. A natural resonance frequency of the resonance impedance unit is approximately equaled to the switching frequency. The resonance impedance unit may include a capacitor and an inductor wound in series with the capacitor. The resonance impedance unit is used for blocking feedback noise induced when a loading on the secondary side of the transformer is varied.

According to another embodiment of this disclosure, the resonance transforming module includes a switch unit and a dimming control unit. An output of the switch unit is coupled to the primary side of the transformer. The switch unit switches according to at least one pulse-width modulation signal, such that an input voltage is selectively transmitted from the switch unit to the primary side of the transformer. The dimming control unit is used for adjusting a duty or a frequency of the at least one pulse-width modulation signal, or used for periodically turning off the at least one pulse-width modulation signal, so as to control output luminance of the at least one light-emitting load. The switch unit may include a half-bridge switch circuit or a full-bridge switch circuit.

According to another embodiment of this disclosure, the signal processing device includes at least one rectifier unit corresponding to the at least one light-emitting load. The at least one rectifier unit is used for transforming the alternating current power supply into the direct current power supply. The at least one rectifier unit may include a half-wave rectifier circuit or a full-wave rectifier circuit.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
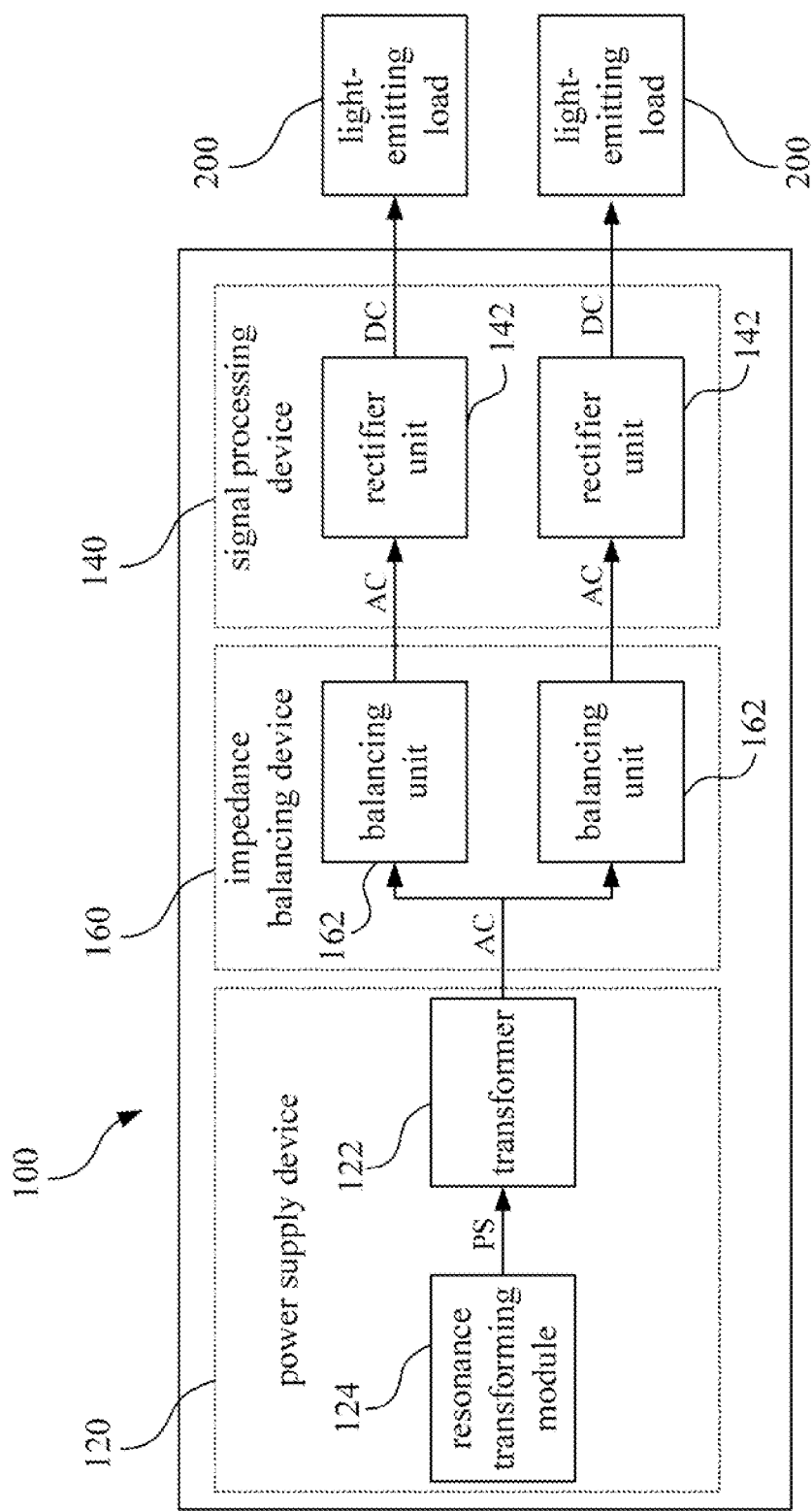
FIG. 1 is a functional block diagram illustrating a driving circuit structure according to an embodiment of the invention.

Reference is made to FIG. 1, which is a functional block diagram illustrating a driving circuit structure 100 according to an embodiment of the invention. The driving circuit structure 100 is used for driving at least one light-emitting load. In practical applications, the light-emitting load may include at least one light-emitting diode (LED) component. The driving circuit structure 100 can be used to drive multiple light-emitting loads. In this embodiment, the driving circuit structure 100 is described, by way of example, as driving two light-emitting loads 200. However, the invention should not be limited in this regard. As shown in FIG. 1, the driving circuit structure 100 includes a power supply device 120, a signal processing device 140 and an impedance balancing device 160.

The power supply device 120 is used for providing an alternating current power supply. As shown in FIG. 1, the power supply device 120 may include a transformer 122 and a resonance transforming module 124. The resonance transforming module 124 is used for generating a resonance pulse signal PS to a primary side of the transformer 122, so as to form the alternating current power supply AC on a secondary side of the transformer 122.

The signal processing device 140 is used for transforming the alternating current power supply AC into a direct current power supply DC for driving the light-emitting loads 200. As shown in FIG. 1, corresponding to each of the light-emitting loads 200, the signal processing device 140 includes at least one rectifier unit 142. Each rectifier unit 142 is used for transforming the alternating current power supply AC into the direct current power supply DC.

The impedance balancing device 160 is used for balancing an alternating current magnitude of the alternating current supply AC, so as to stabilize a direct current magnitude of the direct current power supply DC, which is used for driving the light-emitting loads 200. As shown in FIG. 1, the impedance balancing device 160 includes a pair of balancing units 162 corresponding to the light-emitting loads 200, respectively. Each of the balancing units 162 is coupled between the secondary side of the transformer 122 and one of the light-emitting loads 200.

Figure 2:
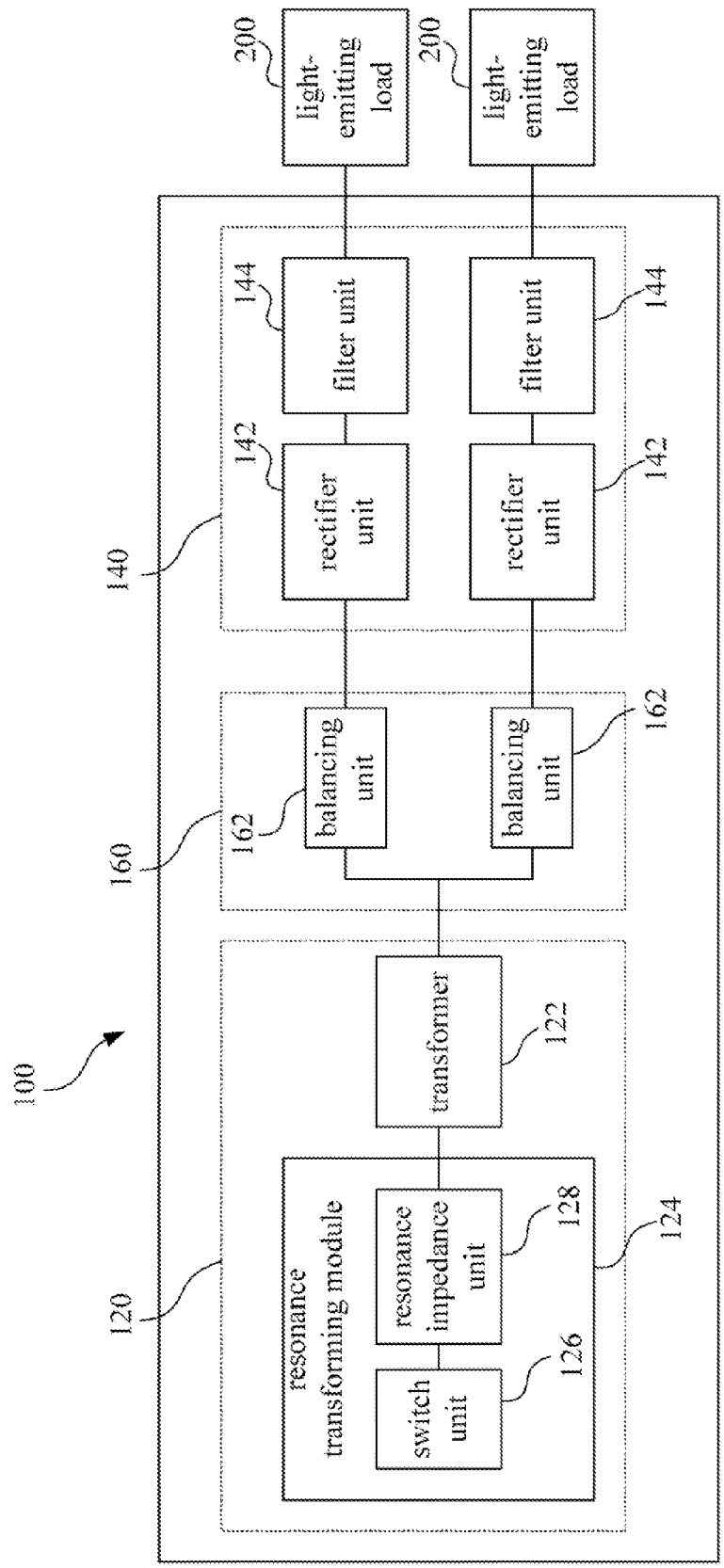
FIG. 2 is a functional block diagram illustrating the driving circuit structure shown in FIG. 1, in which aspects of the driving circuit structure are shown in greater detail.
Figure 3:
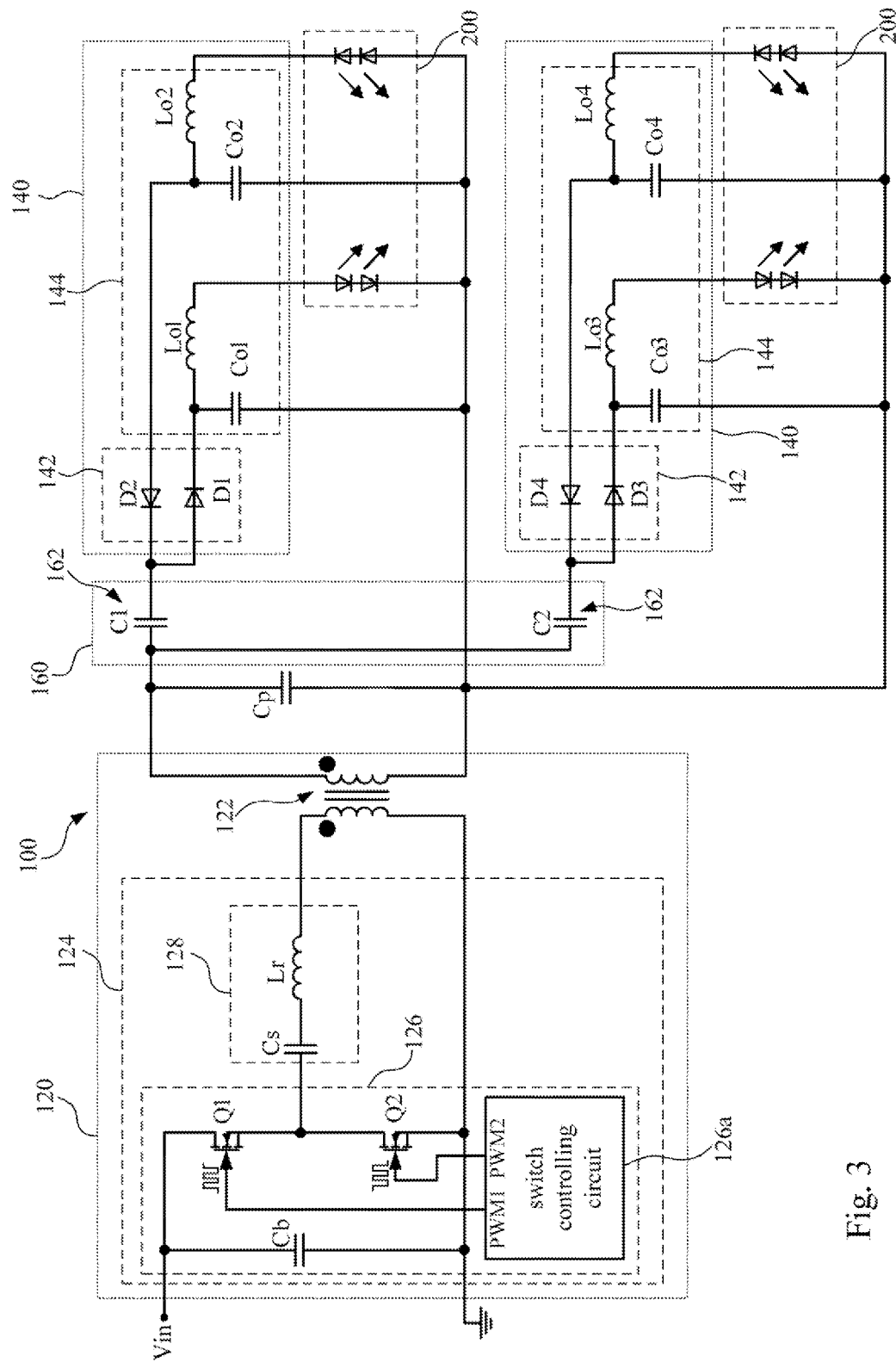
FIG. 3 is a schematic diagram illustrating the driving circuit structure shown in FIG. 2 according to a practical embodiment.

The detailed structure and operation of the driving circuit structure 100 are disclosed in the following embodiments of the invention. Reference is also made to FIG. 2 and FIG. 3. FIG. 2 is a functional block diagram illustrating the driving circuit structure 100 shown in FIG. 1, in which aspects of the driving circuit structure 100 are shown in greater detail. FIG. 3 is a schematic diagram illustrating the driving circuit structure 100 shown in FIG. 2 according to a practical embodiment.

As shown in FIG. 2, the resonance transforming module 124 includes a switch unit 126. An output of the switch unit 126 is coupled to the primary side of the transformer 122. The switch unit 126 selectively transmits an input voltage Vin (see FIG. 3) received thereby to the primary side of the transformer 122 according to a switching frequency. As shown in FIG. 3, the switch unit 126 can be a half-bridge switch circuit, which includes two switch components Q1, Q2 and a switch controlling circuit 126*a* for controlling these two switch components Q1, Q2. The switch controlling circuit 126*a* may generate two pulse width modulation (PWM) signals with opposite phases to the switch components Q1, Q2 for switching the on/off states of the switch components Q1, Q2, such that the voltage Vin or a grounded voltage is selectively transmitted from the switch unit 126 to the primary side of the transformer 122.

Furthermore, in the embodiment of the invention shown in FIG. 2, the resonance transforming module 124 further includes a resonance impedance unit 128. The resonance impedance unit 128 is coupled between the switch unit 126 and the transformer 122. As shown in FIG. 3, the resonance impedance unit 128 may include a capacitor Cs and an inductor Lr, in which the capacitor Cs and the inductor Lr may be series-wound. It is noted that a natural resonance frequency formed by the capacitor Cs and the inductor Lr of the resonance impedance unit 128 is approximately equal to the switching frequency of the switch unit 126. In this case, even when an output load of the driving circuit structure is varied, e.g., by adding or removing light-emitting loads 200, the system signals at the input stage (e.g., the input voltage Vin) will not be affected. In other words, the resonance impedance unit 128 can be used to block feedback noise induced when the output load on the secondary side of the transformer 122 is varied.

As shown in FIG. 2, the signal processing device 140 in this embodiment of the invention includes one rectifier unit 142 corresponding to each of the light-emitting loads 200, and the signal processing device 140 may further include one filter unit 144 also corresponding to each of the light-emitting loads 200. The rectifier unit 142 can be a half-wave rectifier circuit or a full-wave rectifier circuit. As shown in FIG. 3, the rectifier unit 142 corresponding to one of the light-emitting loads 200 is a half-wave rectifier circuit including a diode D1 and a diode D2. The rectifier unit 142 corresponding to the other one of the light-emitting loads 200 is a half-wave rectifier circuit including a diode D3 and a diode D4. The filter unit 144 can be formed by inductors and capacitors (e.g., the inductors Lo1~Lo4 and the capacitors Co1~Co4 shown in FIG. 3) for filtering the DC driving signal after rectification.

As shown in FIG. 2, the impedance balancing device 160 includes two balancing units 162 corresponding to the light-emitting loads 200, respectively. Each of the balancing units 162 is coupled between the secondary side of the transformer 122 and one of the light-emitting loads 200. As shown in FIG. 3, each balancing unit 162 includes a capacitor (e.g., the capacitor C1 or the capacitor C2 shown in FIG. 3).

The capacitor C1 and the capacitor C2 are used for balancing differences in characteristics between the two different light-emitting loads 200, so as to ensure that electrical references on each light-emitting loop are approximately equal. Therefore, the currents over all light-emitting loads 200 can be even and balanced.

Furthermore, the capacitor C1 and the capacitor C2 of the balancing units 162 may serve as buffers between the light-emitting loads 200 and the driving signals generated by the transformer 122, so as to balance the alternating current magnitude of the alternating current power supply AC. When the output voltage of the transformer 122 is varied, most of the voltage variance will be applied on the capacitor C1 and the capacitor C2 without affecting the light-emitting loads 200 directly. In this way, the voltage variation on the light-emitting loads 200 can be reduced, and also the direct current magnitude of the direct current power supply DC used for driving each light-emitting load 200 is stabilized.

Furthermore, the driving circuit structure 100 includes a capacitor Cp coupled between two ends of the secondary side of the transformer 122.

Figure 4:
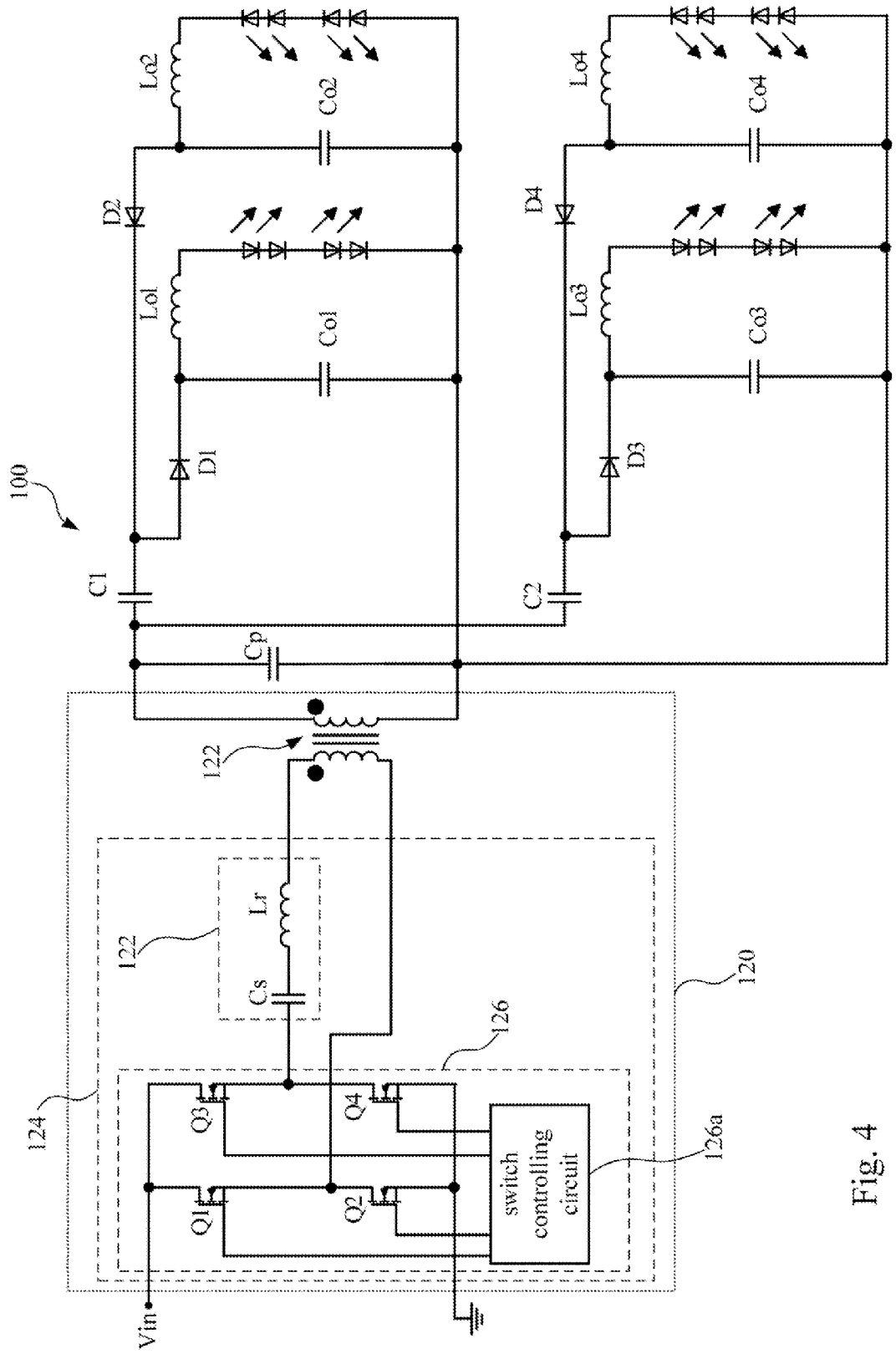
FIG. 4 is a schematic diagram illustrating a switch unit of a resonance transforming module utilizing a full-bridge switch circuit according to another embodiment of the invention.

In the embodiment of the invention shown in FIG. 3, the switch unit 126 utilizes a half-bridge switch circuit (switch components Q1~Q2). However, the invention is not limited to such a configuration. In another embodiment, the switch unit 126 may utilize a full-bridge switch circuit. FIG. 4 is a schematic diagram illustrating a configuration in which the switch unit 126 of the resonance transforming module 120 utilizes a full-bridge switch circuit according to another embodiment of the invention. Compared with the embodiment shown in FIG. 3, the switch unit 126 shown in FIG. 4 is a full-bridge switch circuit, which includes four switch components Q1~Q4. The switch controlling circuit 126*a* may generate four sets of PWM signals with different phases respectively to the switch components Q1~Q4, so as to switch the on/off states of the switch components Q1~Q4. Details with respect to control theory of a full-bridge switch circuit are well known by those in the art, and so a detailed description of the same will not be provided herein.

Figure 5:
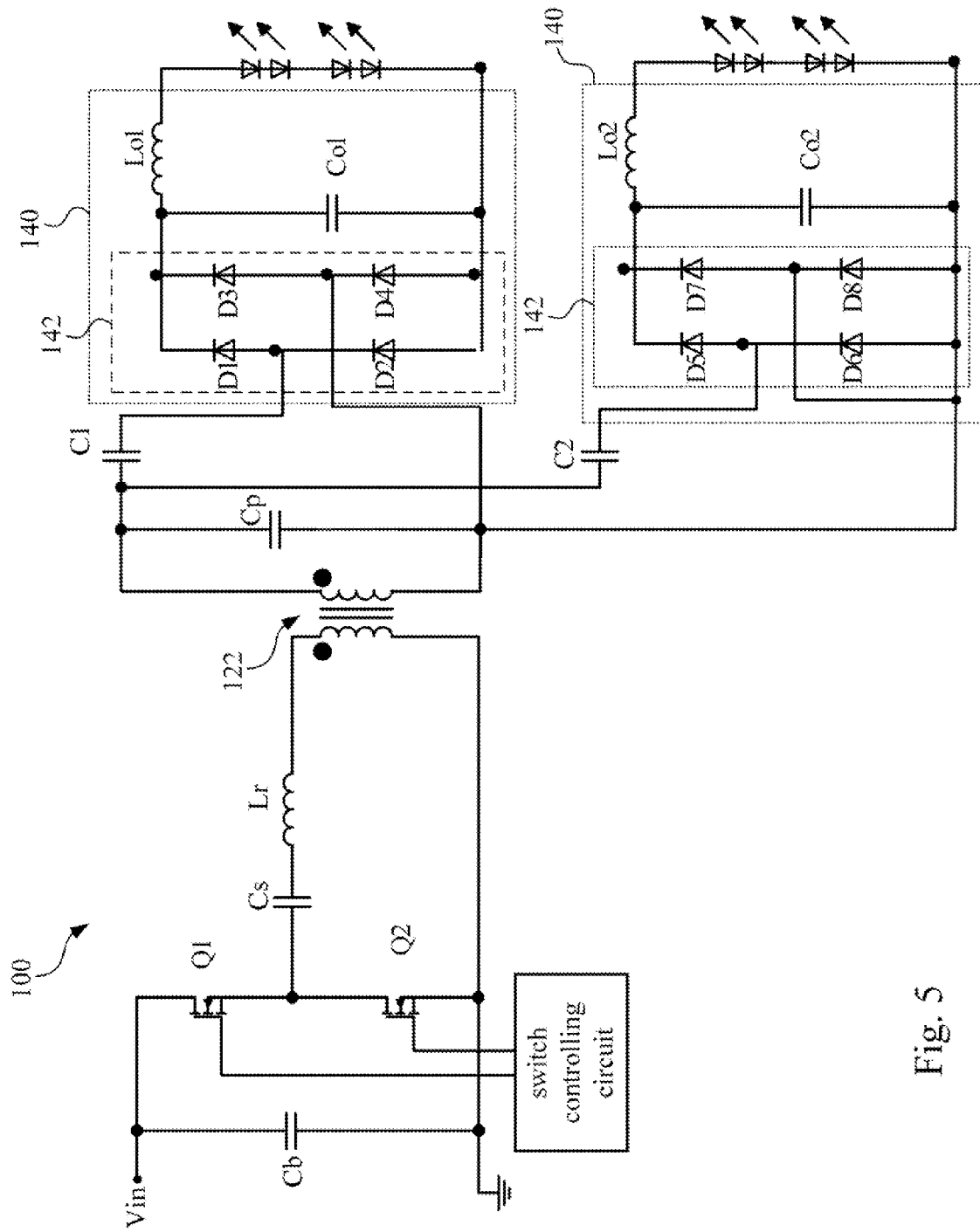
FIG. 5 is a schematic diagram illustrating rectifier units of a signal processing device utilizing full-wave filter circuits according to another embodiment of the invention.

Also, the rectifier units 142 in the signal processing device 140 shown in FIG. 3 utilize half-wave filter circuits (the diodes D1 and D2 forming one half-wave filter circuit, and the diodes D3 and D4 forming the other half-wave filter circuit). However, the invention is not limited in this regard. In another embodiment, the rectifier units 142 may utilize full-wave filter circuits. FIG. 5 is a schematic diagram illustrating a configuration in which the rectifier units 142 of the signal processing device 140 utilize full-wave filter circuits according to another embodiment of the invention. Compared with the embodiment shown in FIG. 3, the rectifier units 142 can be full-wave filter circuits (one of the full-wave filter circuits including diodes D1~D4, and the other including diodes D5~D8). Details with respect to control theory of full-wave filter circuits are well known by those in the art, and so a detailed description of the same will not be provided herein.

Figure 6:
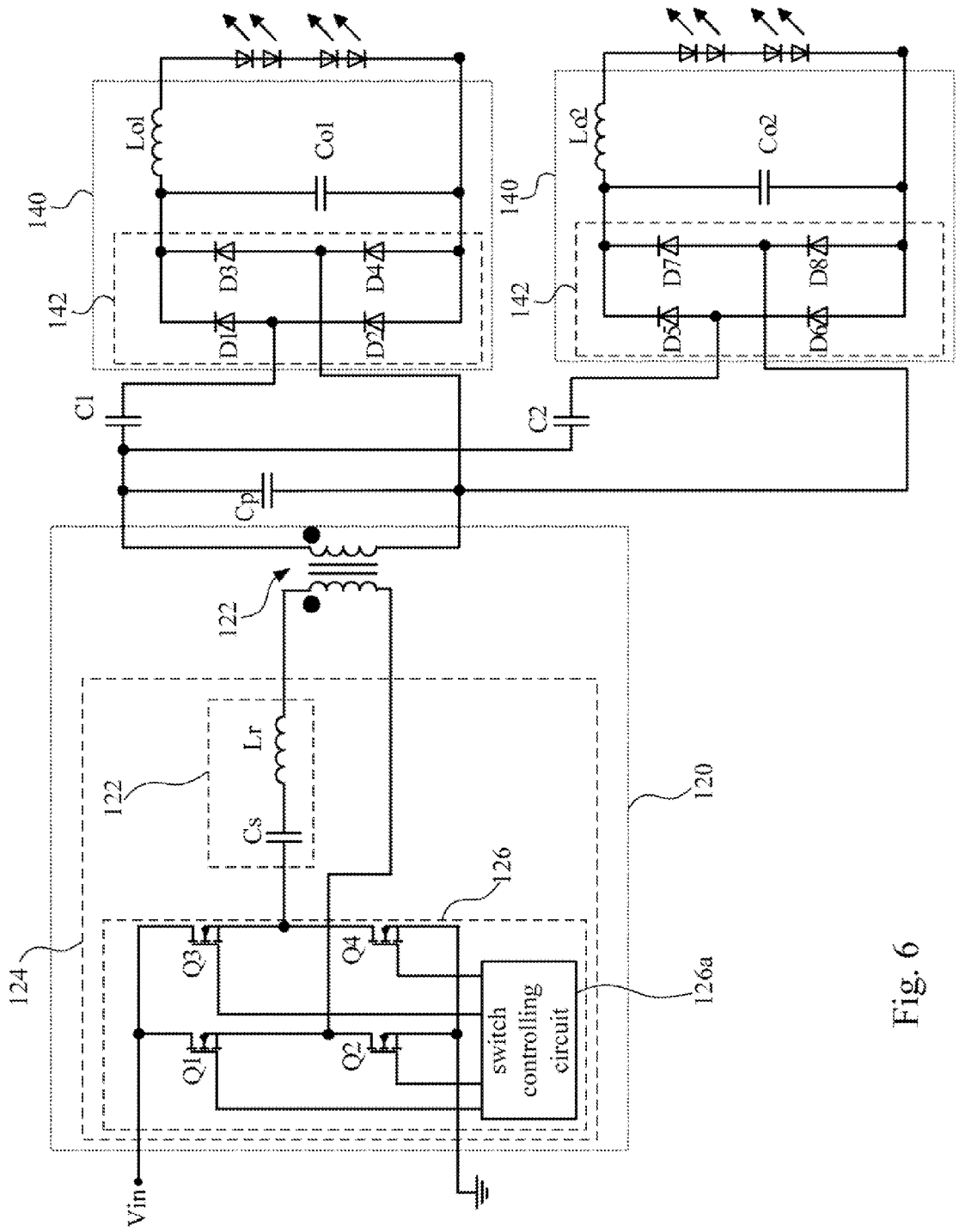
FIG. 6 is a schematic diagram illustrating the switch unit utilizing a full-bridge switch circuit and the rectifier units utilizing full-wave filter circuits according to another embodiment of the invention.

FIG. 6 is a schematic diagram illustrating a configuration in which the switch unit 126 utilizes a full-bridge switch circuit and the rectifier units 142 utilize full-wave filter circuits according to another embodiment of the invention. In the embodiment shown in FIG. 6, the switch unit 126 is a full-bridge switch circuit including four switch components Q1~Q4, and the two rectifier units 142 are two full-wave rectifier circuits including diodes D1~D4 and diodes D5~D8. For details with respect to structures and operations of other circuit elements shown in FIG. 6, reference may be made to the aforesaid embodiments described in relation to FIG. 1 to FIG. 3.

As mentioned in the aforesaid paragraphs, the driving circuit structure 100 of the disclosure includes simple impedance balancing units (e.g., capacitors C1 and C2) in front of the light-emitting loads 200, so as to balance the direct current power supply on different light-emitting loads 200 and elevate the stability of the DC driving current.

Figure 7:
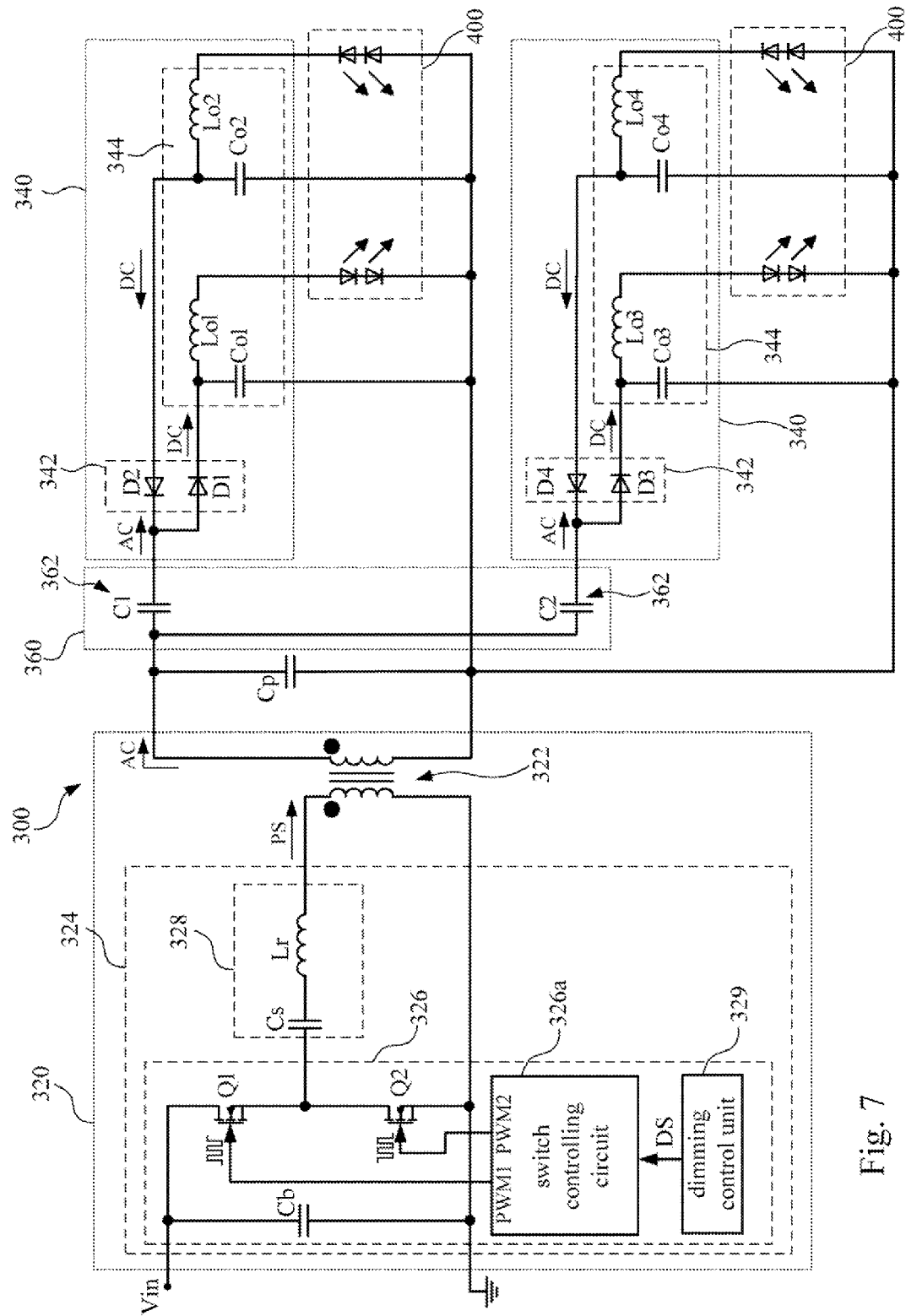
FIG. 7 is a functional block diagram illustrating a driving circuit structure according to another embodiment of the invention.

FIG. 7 is a functional block diagram illustrating a driving circuit structure 300 according to another embodiment of the invention. The driving circuit structure 300 is used for driving at least one light-emitting load. In practical applications, the light-emitting load may include at least one light-emitting diode (LED) component. The driving circuit structure 300 can be used to drive multiple light-emitting loads. In this embodiment, the driving circuit structure 300 is described, by way of example, as driving two light-emitting loads 400. However, the invention should not be limited in this regard. As shown in FIG. 7, the driving circuit structure 300 includes a power supply device 320, a signal processing device 340 and an impedance balancing device 360.

The power supply device 320 is used for providing an alternating current power supply. As shown in FIG. 7, the power supply device 320 may include a transformer 322 and a resonance transforming module 324. The resonance transforming module 324 is used for generating a resonance pulse signal PS to a primary side of the transformer 322, so as to form the alternating current power supply AC on a secondary side of the transformer 322.

The signal processing device 340 is used for transforming the alternating current power supply AC into a direct current power supply DC for driving the light-emitting loads 400. As shown in FIG. 7, corresponding to each of the light-emitting loads 400, the signal processing device 340 includes at least one rectifier unit 342. Each rectifier unit 342 is used for transforming the alternating current power supply AC into the direct current power supply DC.

The impedance balancing device 360 is used for balancing an alternating current magnitude of the alternating current supply AC, so as to stabilize a direct current magnitude of the direct current power supply DC, which is used for driving the light-emitting loads 400. As shown in FIG. 7, the impedance balancing device 360 includes a pair of balancing units 362 corresponding to the light-emitting loads 400, respectively. Each of the balancing units 362 is coupled between the secondary side of the transformer 322 and one of the light-emitting loads 400.

As shown in FIG. 7, the resonance transforming module 324 includes a switch unit 326 and a dimming control unit 329. An output of the switch unit 326 is coupled to the primary side of the transformer 322. The switch unit 326 selectively transmits an input voltage Vin received thereby to the primary side of the transformer 322 according to a switching frequency. As shown in FIG. 7, the switch unit 326 can be a half-bridge switch circuit, which includes two switch components Q1, Q2 and a switch controlling circuit 326a for controlling these two switch components Q1, Q2. The switch controlling circuit 326a may generate two pulse width modulation signals PWM1, PWM2 with opposite phases to the switch components Q1, Q2 for switching the on/off states of the switch components Q1, Q2, such that the voltage Vin or a grounded voltage is selectively transmitted from the switch unit 326 to the primary side of the transformer 322.

The dimming control unit 329 is used for adjusting duty intervals of the pulse-width modulation signals PWM1, PWM2, or adjusting frequencies of the pulse-width modulation signals PWM1, PWM2. Accordingly, the output luminance of the light-emitting loads 400 can be controlled by the dimming control unit 329.

For example, the dimming control unit 329 may shorten the duty of the pulse-width modulation signal PWM1, so as to reduce the output luminance of the light-emitting loads 400. Alternatively, the dimming control unit 329 may enlarge the frequencies of the pulse-width modulation signals PWM1, PWM2, so as to reduce the period of signal oscillation and reduce the output luminance of the light-emitting loads 400.

In another embodiment of the invention, the dimming control unit 329 may turn off the pulse-width modulation signals PWM1 and PWM2 periodically, i.e., the dimming control unit 329 may implement a burst-mode dimming control. The pulse-width modulation signals PWM1, PWM2 are turned off periodically, such that the bridge switch circuit (i.e., the switch unit 326) is disabled for a dimming period of time. The length of the dimming period of time can be configured for adjusting the average current going through the light-emitting diodes 400, so as to modulate the luminance of the light-emitting diodes 400.

Therefore, only one dimming control unit 329 is needed for generating the dimming signal (such as the dimming signal DS shown in FIG. 7) to the switch controlling circuit 326a. According to the dimming signal DS, the switch controlling circuit 326a is used for adjusting the duty intervals of the pulse-width modulation signals PWM1, PWM2, or adjusting the frequencies of the pulse-width modulation signals PWM1, PWM2, or periodically turning off all of the pulse-width modulation signals PWM1, PWM2. Accordingly, the waveform of the resonance pulse signal PS on the primary side of the transformer 322 can be modified, and the alternating current power supply AC on the secondary side of the transformer 322 is also changed correspondingly. Therefore, the direct current magnitude of the direct current power supply DC for driving the light-emitting loads 400 is modified accordingly, so as to realize output luminance adjustment.

The driving circuit structure 300 in this disclosure includes a dimming control unit 329 disposed in the power supply device 320. The dimming control unit 329 is used for adjusting the switch control signals (i.e., the pulse-width modulation signals PWM1, PWM2) of the switch unit 326 at the primary side, such that the output luminance of several light-emitting loads can be adjusted at once. In comparison, each of the light-emitting loads needs one dimming component in a traditional dimming structure. This embodiment of the invention has advantages of higher dimming efficiency and lower production cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit structure for driving at least two parallel light-emitting loads, the driving circuit structure comprising:
   a power supply device for supplying an alternating current power supply, the power supply device comprising:
      a resonance impedance unit, the resonance impedance unit being used for blocking feedback noise induced when an output load of the driving circuit structure is varied, the resonance impedance unit and comprising a capacitor and an inductor;
      a transformer;
      a resonance transforming module for generating a resonance pulse signal to a primary side of the transformer, so as to form the alternating current power supply on a secondary side of the transformer; and
      a switch unit, wherein an output of the switch unit is coupled to the primary side of the transformer, and the switch unit selectively transmits an input voltage from the switch unit to the primary side of the transformer according to a switching frequency, the resonance impedance unit is coupled between the switch unit and the transformer, and a natural resonance frequency of the resonance impedance unit is approximately equaled to the switching frequency;
   a signal processing device for transforming the alternating current power supply into direct current power supplies for driving the at least two parallel light-emitting loads; and
   an impedance balancing device comprising a plurality of balancing units, wherein the balancing units are for balancing an alternating current magnitude of the alternating current supply, so as to stabilize direct current magnitudes of the direct current power supplies used for driving the light-emitting loads, wherein each of the balancing units is coupled between the secondary side of the transformer and the signal processing device.

2. The driving circuit structure of claim 1, wherein the capacitor and the inductor of the resonance impedance unit are series-wound.

3. The driving circuit structure of claim 1, wherein the switch unit comprises a half-bridge switch circuit or a full-bridge switch circuit.

4. The driving circuit structure of claim 1, wherein the resonance transforming module comprises
   a dimming control unit, the dimming control unit being used for adjusting a duty or a frequency of at least one pulse-width modulation signal, or used for periodically turning off the at least one pulse-width modulation signal, so as to control output luminance of the at least two light-emitting loads;
   wherein the switch unit switches according to the at least one pulse-width modulation signal, such that an input voltage is selectively transmitted from the switch unit to the primary side of the transformer.

5. The driving circuit structure of claim 1, wherein the impedance balancing device comprises at least two balance units, each of the balance units is coupled between the secondary side of the transformer and one of the light-emitting load, and each of the balance units comprises a capacitor.

6. The driving circuit structure of claim 1, wherein the signal processing device comprises at least two rectifier units corresponding to the at least two light-emitting loads, and the rectifier units are used for transforming the alternating current power supply into the direct current power supplies.

7. The driving circuit structure of claim 6, wherein each of the rectifier units comprises a half-wave rectifier circuit or a full-wave rectifier circuit.

8. A driving circuit structure for driving at least two parallel light-emitting loads, the driving circuit structure comprising:
   a transformer, the at least two light-emitting loads being parallel coupled to a secondary side of the transformer;
   a resonance transforming module, the resonance transforming module being coupled to a primary side of the transformer, the resonance transforming module comprising:
      a resonance impedance unit, the resonance impedance unit comprising a capacitor and an inductor wound in series with the capacitor; and
      a switch unit, an output of the switch unit is coupled to the primary side of the transformer, the switch unit selectively transmits an input voltage from the switch unit to the primary side of the transformer according to a switching frequency, and a natural resonance frequency of the resonance impedance unit is approximately equaled to the switching frequency;
   at least two rectifier units, wherein each of rectifier units is coupled between the secondary side of the transformer and one light-emitting load; and
   at least two balancing units, wherein each of the balancing units is coupled between the secondary side of the transformer and one of the rectifier units, and the balancing units are used for balancing direct current magnitudes on the light-emitting loads, wherein the balancing units are coupled to the secondary side of transformer in parallel.

9. The driving circuit structure of claim 8, wherein the resonance impedance unit is coupled between the switch unit and the transformer.

10. A driving circuit structure for driving at least two light-emitting loads, the driving circuit structure comprising:
   a transformer, the at least two light-emitting loads being parallel coupled to a secondary side of the transformer;
   a resonance transforming module, the resonance transforming module being coupled to a primary side of the transformer, the resonance transforming module comprising:
      a resonance impedance unit, the resonance impedance unit comprising a capacitor and an inductor wound in series with the capacitor; and
      a switch unit, wherein an output of the switch unit is coupled to the primary side of the transformer, the switch unit switches according to at least one pulse-width modulation signal, such that an input voltage is selectively transmitted from the switch unit to the primary side of the transformer, wherein the a natural resonance frequency of the resonance impedance unit is approximately equaled to a frequency of the at least one pulse-width modulation signal;
   at least two balancing units, each of the balancing units coupled between the secondary side of the transformer and one of the light-emitting loads, the balancing units being used for balancing direct current magnitudes on the light-emitting loads, wherein the two balancing units are coupled to the transformer in parallel; and a dimming control unit, the dimming control unit being coupled with the resonance transforming module, the dimming control unit being used for controlling output luminance of the light-emitting loads.

11. The driving circuit structure of claim 10, wherein the dimming control unit is used for adjusting a duty or a frequency of the at least one pulse-width modulation signal, or used for periodically turning off the at least one pulse-width modulation signal, so as to control output luminance of the light-emitting loads.

12. A driving circuit structure for driving at least two parallel light-emitting loads, the driving circuit structure comprising:

a transformer;

a resonance transforming module for generating a resonance pulse signal to a primary side of the transformer, so as to form an alternating current power supply on a secondary side of the transformer, the resonance transforming module comprising:

a resonance impedance unit, the resonance impedance unit comprising a capacitor and an inductor wound in series with the capacitor; and a switch unit, an output of the switch unit is coupled to the primary side of the transformer, the switch unit selectively transmits an input voltage from the switch unit to the primary side of the transformer according to a switching frequency, the resonance impedance unit is coupled between the switch unit and the transformer, and a natural resonance frequency of the resonance impedance unit is approximately equaled to the switching frequency;

a signal processing device for transforming the alternating current power supply into direct current power supplies for driving the light-emitting loads; and at least two balancing units, each of balancing units coupled between the secondary side of the transformer and the signal processing device, each of the balancing units comprising a capacitor, the balancing units being used for balancing an alternating current magnitude of the alternating current supply, so as to stabilize direct current magnitudes of the direct current power supplies used for driving the light-emitting loads, wherein the balancing units are coupled to the transformer in parallel.

13. The driving circuit structure of claim 12, wherein the resonance impedance unit is used for blocking feedback noise induced when a loading on the secondary side of the transformer is varied.

14. The driving circuit structure of claim 12, wherein the switch unit comprises a half-bridge switch circuit or a full-bridge switch circuit.

15. The driving circuit structure of claim 12, wherein the resonance transforming module comprises a dimming control unit, the dimming control unit being used for adjusting a duty or a frequency of at least one pulse-width modulation signal, or used for periodically turning off the at least one pulse-width modulation signal, so as to control output luminance of the at least one light-emitting loads;

wherein the switch unit switches according to the at least one pulse-width modulation signal, such that an input voltage is selectively transmitted from the switch unit to the primary side of the transformer.

16. The driving circuit structure of claim 12, wherein the signal processing device comprises at least two rectifier units corresponding to the at least two light-emitting loads, and the rectifier units are used for transforming the alternating current power supply into the direct current power supplies.

17. The driving circuit structure of claim 16, wherein each of the rectifier units comprises a half-wave rectifier circuit or a full-wave rectifier circuit.

* * * * *